United States Patent [19]
Burns et al.

[11] Patent Number: 6,018,747
[45] Date of Patent: Jan. 25, 2000

[54] METHOD FOR GENERATING AND RECONSTRUCTING IN-PLACE DELTA FILES

[75] Inventors: Randal Chilton Burns, Sunnyvale; Darrell D. E. Long, Soquel, both of Calif.

[73] Assignee: International Business Machines Corporation, Armonk, N.Y.

[21] Appl. No.: 08/978,550

[22] Filed: Nov. 26, 1997

[51] Int. Cl.[7] .................................................. G06F 17/30
[52] U.S. Cl. ........................... 707/203; 707/10; 707/204; 707/202; 395/712
[58] Field of Search ............................ 707/203, 10, 204, 707/202; 395/712

[56] References Cited

U.S. PATENT DOCUMENTS

| | | | |
|---|---|---|---|
| 3,711,863 | 1/1973 | Bloom | 444/1 |
| 4,864,569 | 9/1989 | DeLucia et al. | 714/38 |
| 5,278,979 | 1/1994 | Foster et al. | 395/600 |
| 5,479,654 | 12/1995 | Squibb | 395/600 |
| 5,481,722 | 1/1996 | Skinner | 395/700 |
| 5,495,610 | 2/1996 | Shing et al. | 395/600 |
| 5,559,991 | 9/1996 | Kanfi | 395/489 |
| 5,574,906 | 11/1996 | Morris | 707/1 |
| 5,579,223 | 11/1996 | Raman | 395/751 |
| 5,592,661 | 1/1997 | Eisenberg et al. | 395/600 |
| 5,634,052 | 5/1997 | Morris | 707/1 |
| 5,673,387 | 9/1997 | Chen et al. | 714/38 |
| 5,721,907 | 2/1998 | Pyne | 707/10 |
| 5,745,906 | 4/1998 | Squib | 707/203 |
| 5,752,039 | 5/1998 | Tanimura | 395/712 |
| 5,778,395 | 7/1998 | Whitting et al. | 707/204 |
| 5,794,254 | 8/1998 | McClain | 707/204 |
| 5,802,528 | 9/1998 | Oki et al. | 707/201 |
| 5,813,017 | 9/1998 | Morris | 707/204 |
| 5,828,885 | 10/1998 | Raman | 707/5 |
| 5,893,119 | 4/1999 | Squibb | 707/203 |

OTHER PUBLICATIONS

Alderson, Albert, "A Space–Efficient Technique for Recording Versions of Data", *Software Engineering Journal*, Nov. 1988, pp. 240–246.
Black, Andrew P. et al., "A Compact Representation for File Versions: A Preliminary Report", *IEEE*, 1989, pp. 321–329.
Karp, Richard M. et al., "Efficient Randomized Pattern–Matching Algorithms", *IBM J. Res. Develop.*, vol. 31, No. 2, Mar. 1987, pp. 249–260.
Miller, Webb et al., "A File Comparison Program", *Software—Practice and Experience*, vol. 15(11), 1025–1040, Nov. 1985, pp. 1025–1040.
Plaice, John et al., "A New Approach to Version Control", *IEEE Transactions on Software Engineering*, vol. 19, No. 3, Mar. 1993, pp. 268–275.
Reichenberger, Christoph, "Delta Storage for Arbitary Non–Text Files", *ACM*, 1991, pp. 144–152.
Yu, Lin et al., "A Linear–Time Scheme for Version Reconstruction", *ACM Transactions on Programming Languages and Systems*, vol. 16, No. 3, May 1994, pp. 775–797.

*Primary Examiner*—Jean R. Homere
*Attorney, Agent, or Firm*—Altera Law Group, LLC

[57] ABSTRACT

The present invention discloses a method, apparatus, and article of manufacture for generating, transmitting, replicating, and rebuilding in-place reconstructible software updates to a file from a source computer to a target computer updates to a file from a source computer to a target computer. The present invention stores the first version of the file and the updates to the first version of the file in the memory of the source computer. The first version is also stored in the memory of the target computer. The updates are then transmitted from the memory of the source computer to the memory of the target computer. The present invention uses these updates at the target computer to build the second version of the file in-place.

27 Claims, 6 Drawing Sheets

METHOD FOR GENERATING AND RECONSTRUCTING IN-PLACE DELTA FILES

BACKGROUND OF THE INVENTION

1. Field of the Invention

This invention relates generally to reconstructing versions of a file and particularly, to reconstructing versions of a file in-place when data storage space and memory resources are limited.

2. Description of Related Art

Recent developments in portable computing and computing appliances have resulted in a proliferation of small network attached computing devices, including network computers. Network computers (NCs) place many computers with limited storage and memory resources onto the same network. The limited capacity of these computers is mitigated by low cost and the absence of intense computational work to be performed at the NC. Often these NCs are diskless, storing their operating system or other software in non-volatile random access memory (NVRAM) or flash RAM.

Without local storage or attached media devices, NCs must download updates to their operating system or other software from the attached network. Often in this computing environment, the ability of client computers to update their local software is limited by low network bandwidth or server capacity. In addition, many network computers may vie for the same resource. This produces network contention, for example packet collision and token competition on a low bandwidth channel. Multiple clients may also tax the processing power of a single server trying to download software to all of them concurrently. These problems also exists when a software distribution computer (server) distributes software applications, data and/or files to a target computer (client).

Delta file compression at the target computer or NC solves the problems associated with low network bandwidth and limited server capacity. A delta file is the encoding of the output from a differencing method. A differencing method compresses data by taking advantage of the statistical correlation between different versions of the same data sets. In short, differencing methods achieve compression by finding common sequences between two versions of the same data that can be encoded using a copy reference. Differencing methods find and output the changes made between two versions of the same file by locating common sequences to be copied, and by finding unique sequences to be added explicitly.

The differencing method that creates the delta file takes two versions of the file as input, a base file and a version file to be encoded. The method outputs a delta file representing the incremental changes made between versions, as represented below:

$$F_{base} + F_{version} = D_{(base, version)}$$

Reconstruction requires the base file and a delta file to rebuild a version, as represented below:

$$F_{base} + D_{(base, version)} = F_{version}$$

These differencing methods can be used to distribute software over a low bandwidth network such as a point-to-point modem link or the Internet. Upon releasing a new version of software, the version is differenced with respect to the previous version. With compact versions, a low bandwidth channel can effectively distribute a new release of dynamically self-updating software in the form of a binary patch.

The encoding of the output from differencing methods reduces the size of the file to be transmitted and consequently the time to perform software updates. However, decompressing delta encoded files using traditional methods requires scratch space at the target computer, such as data storage space (including memory, disk space, tapes, and any other type of data storage medium). Since both the old file version and the new file version are stored at the same time, the amount of required scratch space is two times the amount required to store the next version. This storage space requirement presents a problem as network attached devices often have limited memory and processor resources in order to limit production costs. For clients with limited space, such as network computers, or computers with limited storage for downloading large applications, such as thin clients, there may be insufficient space for this reconstruction process.

Thus, there is a need in the art for an invention that reduces the amount of time and network bandwidth required to transmit versions of files to a computer in a NC, client/server or distributed file system environment without requiring additional memory or disk space on the target computer.

SUMMARY OF THE INVENTION

To overcome the limitations in the prior art described above, and to overcome other limitations that will become apparent upon reading and understanding the present specification, the present invention discloses a method, apparatus, and article of manufacture for generating in-place reconstructible delta files on a source computer and reconstructing the in-place delta files on a target computer. The present invention creates an in-place reconstructible delta file at the source computer. The in-place reconstructible delta file comprises a plurality of changes made between a prior version of a file and a new version of a file. The prior version of the file is then stored on a target computer.

The present invention transmits the in-place reconstructible delta file from the source computer to the target computer. At the target computer, the invention uses the in-place reconstructible delta file to rebuild the new version of the file in-place. Building in-place means building the second version in the same region of the target computer's memory in which the first version resides.

A further embodiment of the present invention creates a plurality of copies of the in-place reconstructible delta file and transmits the copies to a plurality of servers. The servers are source computers that did not create the in-place reconstructible delta file.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
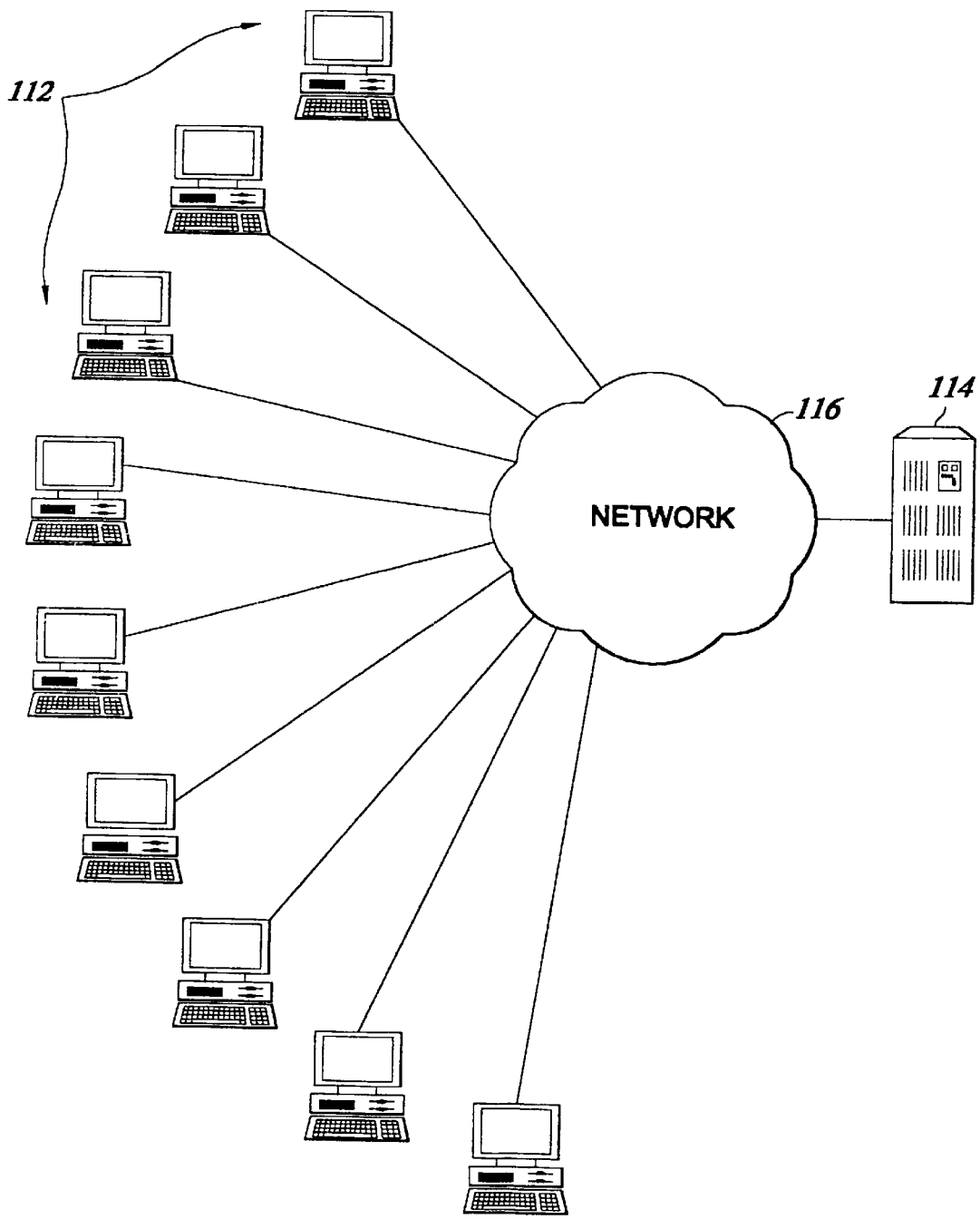
FIG. 1 illustrates an exemplary hardware environment that could be used with the present invention.

In the following description of the preferred embodiments. reference is made to the accompanying drawings which form a part hereof, and in which is shown by way of illustrating a specific embodiment in which the invention may be practiced. It is to be understood that other embodiments may be utilized and structural changes may be made without departing from the scope of the present invention.

Overview

The present invention addresses the problem of reconstructing versions of a file when space is limited. In particular, the preferred embodiment of the invention uses delta file compression to reconstruct files in-place. Delta file compression compactly encodes modifications between two versions of the same file by finding and encoding only the changed bytes. When a target computer needs to update a software component that already exists on its local storage, be it NVRAM, flash RAM or disk, it receives a delta file, representing the new version of this software component as a set of changes from the previous version. This delta encoding should generally be a factor of 10 to 1000 times smaller than the new file version. After the source machine computes this file, it may discard the prior and current version of the file and only the delta file is required to distribute binary data. A source computer may compute this delta file only once and distribute it to a large number of target computers. Additionally, a source computer may distribute the delta file in absence of the version used to create it, thus creating replicated source computers. The new version of the file is created by rebuilding the delta encoded version at the target computer.

To create new versions of the file when space is limited, the present invention rebuilds the delta encoded version in-place, i.e., it builds the new version in the same region of the data storage medium in which the old version resides. In-place delta files are different than regular delta files and generally are created in two steps. The source computer creates a delta file from the current and prior version of the file to be encoded. This delta file may be distributed to clients which have the prior versions and rebuilt at these clients to materialize the new version. For clients that have no additional scratch storage, a source computer generates and provides an in-place reconstructible delta file, i.e., a file that can be rebuilt in the same memory space occupied by the prior version on the target computer.

Normally, delta files read regions of the old version and copy these regions into the new file. However, these files may not always be suitable for in-place reconstruction, as they may write a region of memory, and then later need to read the same region. To correct this problem, an alternative embodiment of the invention post-processes delta encoded files so that they are suitable for reconstructing the new version of the file in the same memory or storage space as the previous file version.

The preferred embodiments of the invention do not require a specific delta encoding method. They are appropriate for use with any method that uses delta files to compactly represent the changes between versions.

Hardware Environment

FIG. 1 schematically illustrates the hardware environment of the preferred embodiment of the present invention, and more particularly, illustrates an exemplary distributed computer system. A typical combination of resources may include clients 112 that are personal computers or workstations, and servers 114, that are personal computers, workstations, minicomputers, or mainframes. These systems are coupled to one another by various networks 116, including LANS, WANs, SNA networks, the Internet, cellular, and radio frequencies. The client computers 112 are coupled with the servers 114 over a line or via a wireless system, such that all data flows from the source computer to the target computer.

Those skilled in the art will recognize many modifications may be made to this configuration without departing from the scope of the present invention.

Graphical Representation

Figure 2A:
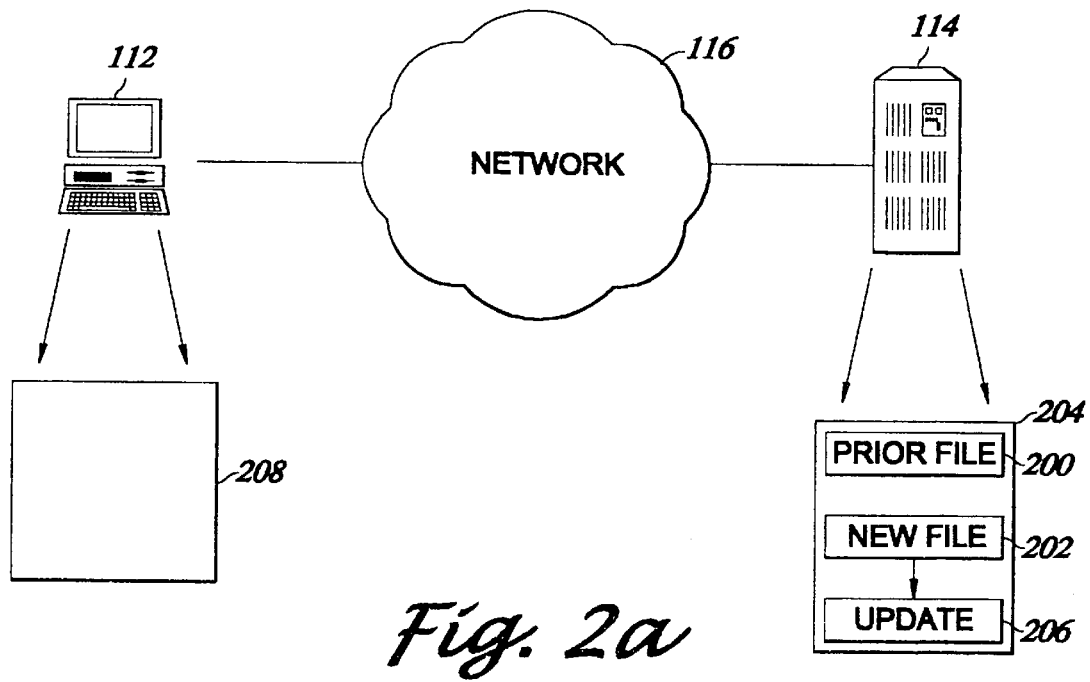
FIGS. 2A–2D graphically illustrate the functions preformed by the present invention.
Figure 2B:
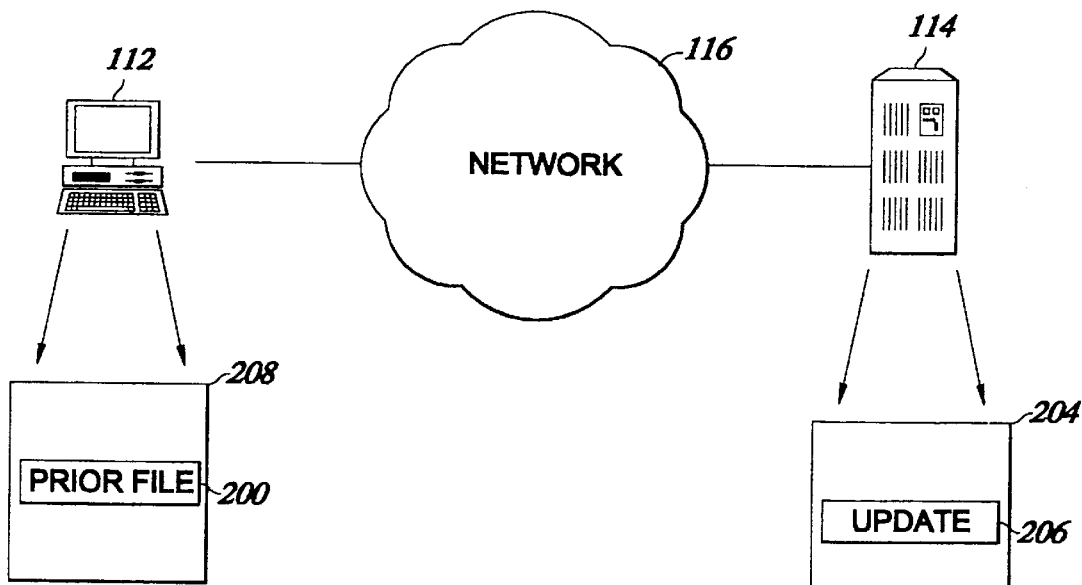
Figure 2C:
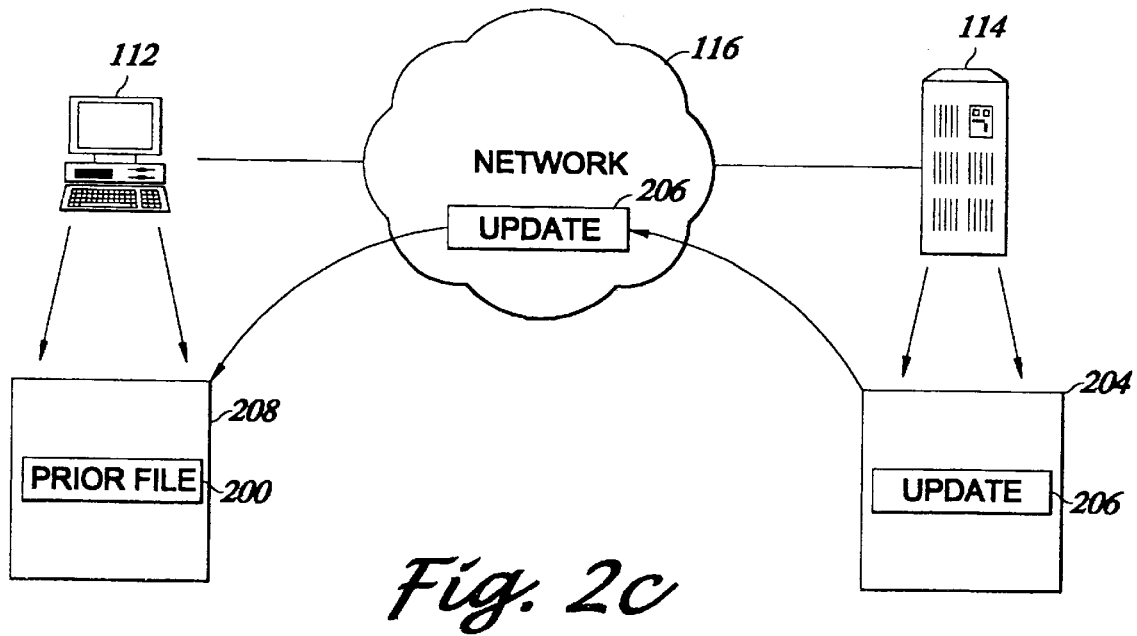

FIGS. 2A–2C are graphical representations of functions performed by the preferred embodiment of the present invention.

FIG. 2A shows the preferred embodiment of the present invention storing a copy of the prior version of the file 200 and the new version of the file 202 in the memory 204 of the source computer 114. The updates 206 are the changes made between the prior version of the file 200 and the new version of the file 202. In the preferred embodiment of the invention, the updates 206 are in the form of delta compression files.

FIG. 2B shows the preferred embodiment of the present invention discarding both the prior version of the file 200 and the new version of the file 202 and storing only the updates 206 in the memory 204 of the source computer 114. The prior version of the file 200 is stored in the memory 208 of the target computer 112.

FIG. 2C shows the preferred embodiment of the present invention transmitting the updates 206 across the network 116 to the memory 208 of the target computer 112.

Figure 2D:
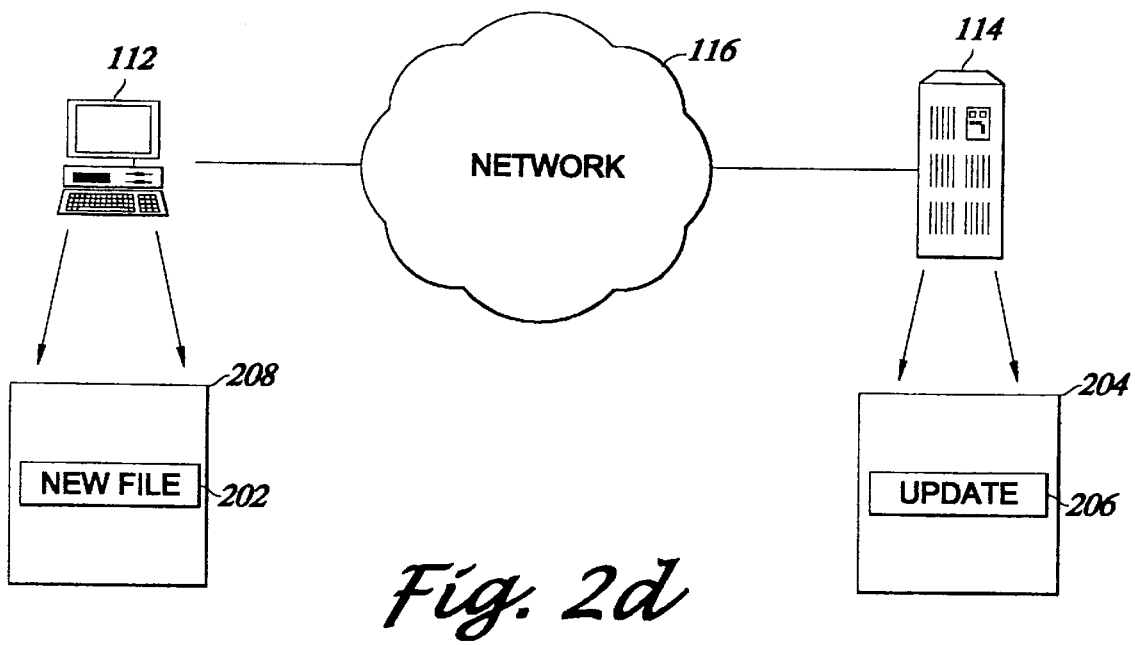

FIG. 2D shows the new version of the file 202 in the memory 208 of the target computer 112. The new version of the file 202 is the sum of the prior version of the file 200 and the updates 206, as shown in the equation below:

$$F_{prior\ version} + D_{(prior\ version,\ new\ version)} = F_{new\ version}$$

The new version of the file 202 occupies the same location in the memory 208 of the target computer 112 as the prior version of the file 200. No additional memory is needed.

Encoding Delta Files

Figure 3:
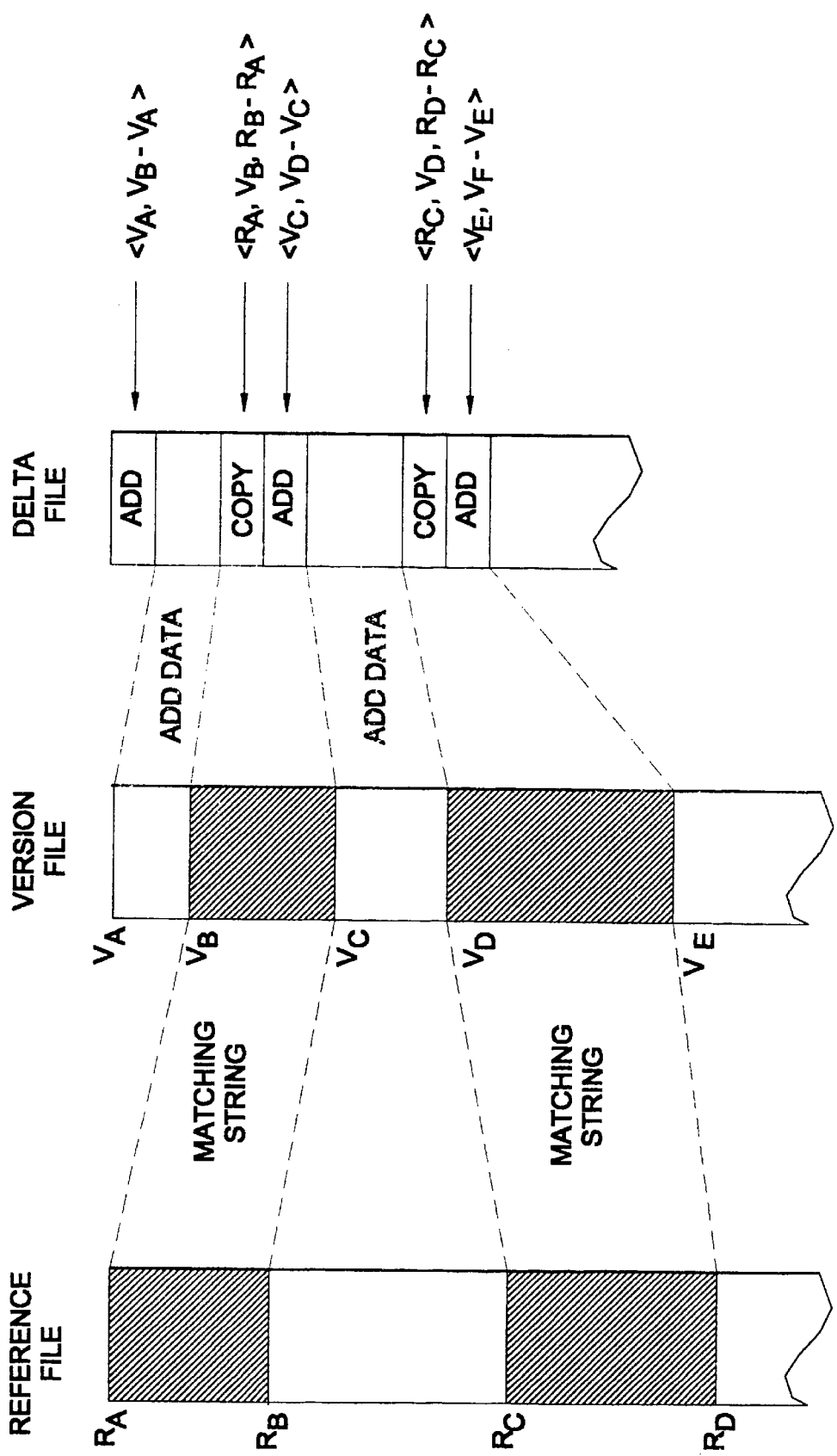
FIG. 3 is a representation of a delta file produced by a delta encoding method.

FIG. 3 is a representation of a prior version 300, new version 302, strings 304, and delta file 306 produced by a delta encoding method. A string is a contiguous and sequential/ordered region of data. This method compactly encodes the changes between file versions by finding strings 304 in the new version 302 that may be copied from the prior version 300 of the same file. The method performs this task by partitioning the data in the new version 302 into strings 304 that may be encoded using copies and as strings 304 that do not appear in the prior version 300 and must be explicitly added to the new version 302. Having partitioned the file to be compressed, the method outputs a delta file 306 that encodes this version compactly. This delta file 306 is comprised of copy commands 308 and add commands 310. An add command 310 is an ordered pair, <t, l>, where t encodes the string 304 offset in the new version 302 and l encodes the length of the string 304. This pair is followed by the l bytes of data to be added. For example, in FIG. 3, the first add command 310 is the ordered pair $<V_A, V_B-V_A>$, where $V_A$ is the string offset and $V_B-V_A$ is the string length.

The encoding of a copy command 308 is an ordered triple of positive integers, <f, t, l>. In this tuple, f encodes the offset in the prior version 300 from which data is copied, t encodes the offset in the new file to which the data is to be written, and l encodes that length of the data to be copied. The copy command 308 is a directive that copies the string data 304 in the interval [f, f+l−1] in the prior version 300 to the interval [t, t+l−1] in the new version 302. For example, in FIG. 3, the first copy command is the set <$R_A$, $V_B$, $R_B-R_A$>, where $R_A$ is the offset in the prior version, $V_B$ is the offset in the new version, and $R_B-R_A$ is the string length.

Conflict Detection

Figure 4:
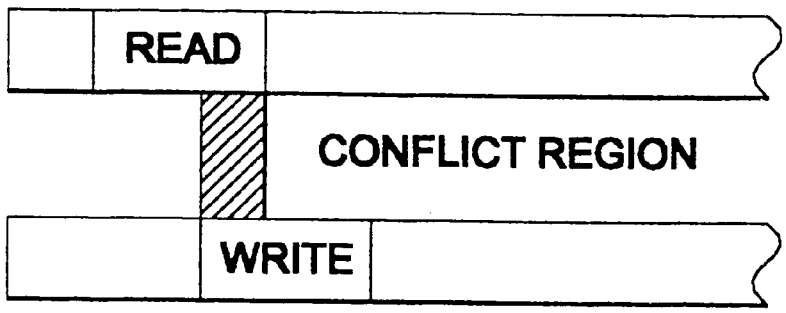
FIG. 4 is a representation of write/read conflict in a delta file.

Since the source machine is generating a delta file that will be reconstructed in-place at the target machine, i.e., the new version 302 is written into the same memory space as the prior version 300, the order in which the copy commands 308 are applied is important. If the delta file 306 attempts to read from a memory offset that has already been written, this will result in an incorrect reconstruction since the prior version 300 data has been overwritten. This is termed a write before read (WR) conflict. FIG. 4 represents such a WR conflict 400.

Write before read conflicts are the only type of data conflicts that are important.
No conflicts occur from:
  Read before Read—Reads are non-destructive and the same data is available at the same offset before and after a read operation.
  Read before Write—Delta files 306 only read data from the prior version 300, i.e., the original data, so it is always correct to read before writing.
  Write before Write—Delta files 306 encode each region of the new version 302. uniquely; i.e. each offset in the new file is written once and only once. So write before write conflicts do not occur.

A formal expression for a write before read conflict is given by the following notation. There is a conflict between the $i^{th}$ copy command <$f_i$, $t_i$, $l_i$> and the $j^{th}$ copy command <$f_j$, $t_j$, $l_j$>, when i<j, $$[f_j, f_j+l_j-1] \cap [t_i, t_i+l_i-1] \neq 0 \quad (1)$$

In other words, a conflict exists if copy command i writes to the interval from which copy command j must read data. For this expression, the invention detects copy commands 308 that are numbered and ordered so that, if i<j, copy command i is read and written before copy command j.

Since the invention applies delta files 306 with no scratch space, the commands must be applied serially. Since the target machine has no scratch space. it must read the delta file directly off of its network and discard data as it reads it. Without storing the delta file locally, commands must be executed in the order that they appear in the delta file.

Under this definition of WIR conflicts, a copy command 308 cannot conflict with itself. Copy commands 308 whose read and write intervals are overlapping can be dealt with by performing the copy in either a left-to-right or right-to-left manner. For a copy command 308, <f, t, l>, if f>t, then when the file is being reconstructed, copy the string byte by byte starting at the start or left-hand side of the string. Since, the from offset is always greater than the to offset, this left-to-right copy never reads a byte that has been over-written by a previous byte in the string. When f<t, symmetric logic indicates that the copy must start at the right hand edge of the string, copying the byte at f+l−1 to t+l−1 and work backwards. For illustrative purposes, the copies are performed in this example in a byte-wise fashion. However, this notion of a left-to-right or right-to-left copy applies to moving blocks or a read-write buffer or any size.

All writes encoded by a delta file are disjoint, that is:

$$\forall i \forall j [t_i, t_i+l_i-1] \cap [t_j, t_j+l_j-1] = 0. \quad (2)$$

The writes in the delta file are disjoint because each region of the new version is uniquely encoded by a single command in the delta file. It follows that all orderings or permutations of the application of the copy commands 308 in a delta file reconstruct the same version file. This is equivalent to the previous statement that there are no write before write conflicts.

To achieve the in place reconstruction of delta files 306, the following two techniques are used:
1. Permute the order in which the copy commands 308 are applied to minimize the number of write before read conflicts.
2. For the remaining write before read conflicts, convert copy commands 308 to add commands 310 to eliminate conflicts.

Any delta file may be post-processed using these two methods to create a delta file that can be reconstructed in place. For many delta files 306, a permutation that eliminates all W/R conflicts is unattainable. So, the add commands 310 are converted to create a correct in-place reconstructible file.

Having post-processed a delta file, the permuted and modified delta file must obey the property:

$$\forall j [f_j, f_j + l_j - 1] \cap \left( \bigcup_{i=1}^{j-1} [t_i, t_i + 1] \right) = 0 \quad (3)$$

This states that no copy command 308 reads from a location that has been previously written. This guarantees that the data that a copy command 308 reads and transfers is always data from the prior version 300.

Generating Conflict Free Permutations

Delta files 306 must be modified so that they meet the criteria for in place reconstruction. At a high level, the technique used by the preferred embodiment of the invention generates a digraph that represents the WIR conflicts between copy commands 308. A schedule is generated that eliminates WR conflicts by converting this digraph into an acyclic digraph.

This method can be most easily described as a post-processing step on an existing delta file, but can easily be integrated into a compression method so that an in-place reconstructible file may be output directly.

This technique constructs a digraph in which each copy command 308 in the delta file is represented by a node in a digraph. A directed edge from node A to node B. $\overrightarrow{AB}$, indicates that copy command A's read interval intersects copy command B's write interval. Consequently, if A is performed before B, there is no WR conflict. For this reason, the edge relation indicates an ordering on the copy commands 308 that will either eliminate or minimize write before read conflicts.

Now, consider a digraph with a simple cycle. This digraph has no ordering that eliminates all conflicts. One of the copy commands 308 in this cycle must be discarded to create an acyclic digraph. A node from the cycle is removed by deleting a copy command 308 and replacing it with an add command 310 that adds the same data that was to be copied. As add commands 310 are followed by the data to be added, this replacement reduces compression in the delta file. Consequently, it is desirable to replace the minimum length copy command 308 in a cycle to break that cycle.

At a high level, a method for this task must generate a digraph indicating WR dependencies and consequently an ordering on all copy commands 308. This digraph is converted into an acyclic digraph that encodes the same file data.

1. Given an input delta file, the first step is to partition the commands in this file into a set C of copy commands 308 and a set A of add commands 310.
2. The copy commands 308 are then sorted into write order C={$c_1, c_2, \ldots, c_n$} where $c_i$=<$f_i, t_i, l_i$> is an ordered triple describing the source offset, destination offset and the length and for i,j $\in$[1, n]:I<j <⇔$t_i$<$t_j$.
3. Next, a digraph is constructed from the copy commands 308. For all copy commands $c_1, c_2, \ldots, c_n$, corresponding nodes or vertices, $v_1, v_2, \ldots, V_n$ are created. The edge relation among the nodes describes write before read conflicts. There is an edge from node $v_i$ to node $v_j$ when copy command $c_i$ reads from the interval to which copy command $c_j$ writes:

$$\overrightarrow{v_i, v_j} \Leftrightarrow [f_j, f_j + l_j - 1] \cap [t_j, t_j + l_j - 1] \neq 0$$

This edge relation describes an ordering on the nodes. An edge from $v_i$ to $v_j$ indicates that by placing the $i^{th}$ copy command before the $j^{th}$ copy command, the delta file will avoid a write before read conflict.

4. The nodes of the digraph are topologically sorted. This topological sort also detects "bad edges" that form cycles in the digraph and breaks the cycles. When breaking a cycle one node is removed from the digraph. The copy command 308 in this removed node is turned into an add command 310 and placed in the set A.
5. Output all remaining copy commands 308 to the delta file in topological sort order.
6. Output all add commands 310 in the set A to the delta file.

This technique generates a schedule on the copy commands 308. The schedule is an ordering of copy commands in which no WR conflicts exists. The copy commands 308 that were converted to add commands 310 break cycles in the digraph. The resulting delta file 306 is a set of copy commands 308 followed by a set of add commands 310. This file reconstructs the new version of the file out of order, and allows the new version to replace the original file in the same memory space. Out of order means that the delta commands are permuted with respect to the original delta file. The version file is thus realized in a way that the data is written non-sequentially, but it is definitely ordered. The ordering is a permuted ordering with respect to the original ordering.

Flowcharts

Figure 5:
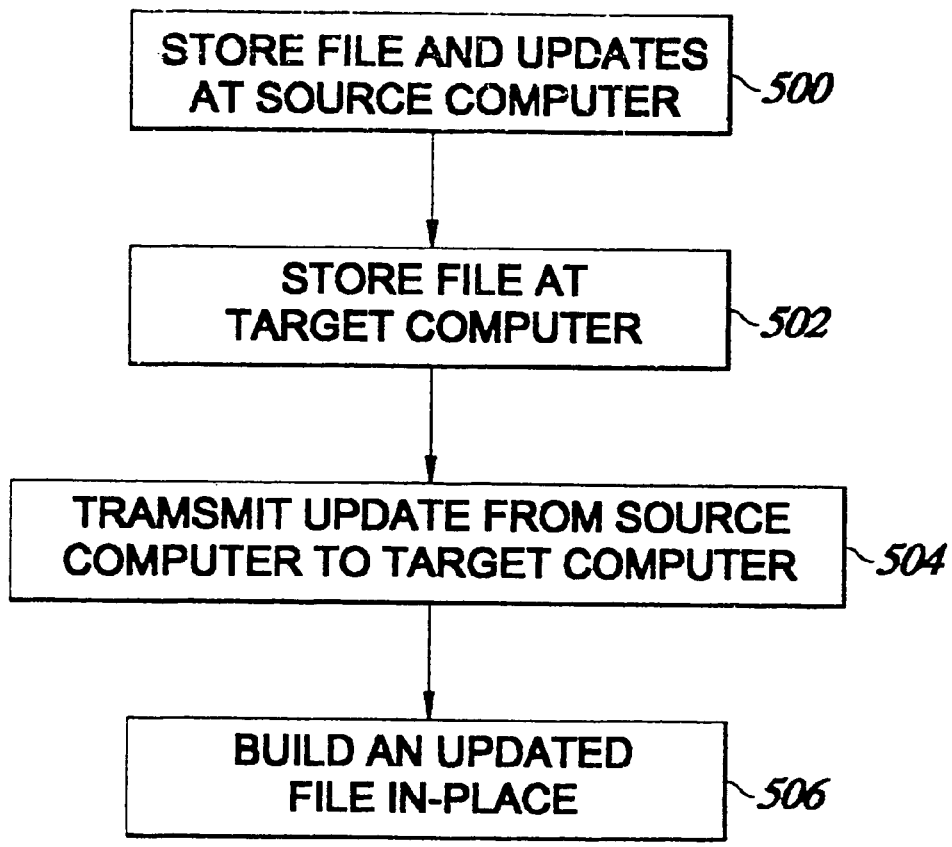
FIG. 5 is a flowchart that illustrates the functions performed by the present invention.

FIG. 5 is a flowchart that illustrate the functions performed by the present invention.

Block 500 represents the preferred embodiment of the present invention storing the first version of the file 200 and updates 202 at the source computer 204. The file is also stored at the target memory location 206, as represented by Block 502. Block 504 represents the present invention transmitting files. Finally, the invention rebuilds the delta encoded version of the file in-place, as represented by Block 506.

If the present invention is interrupted when rebuilding a delta, the delta file will be in an inconsistent state. The version of the delta file on the target computer will be neither the prior version nor the new version, but rather, some combination thereof. Since the prior version has been lost, the target cannot restart rebuilding the delta process. In the worst case, the client must forego delta compression and request a complete and uncompressed copy of the new version. However, a further embodiment of this invention includes a method to interrupt and continue the delta rebuilding process in the presence of system or network failures.

The in-place reconstruction of delta files can be interrupted and continued without restart, assuming that the target computer maintains a progress counter. As the target computer processes copy and add commands the progress counter tracks the executed commands. Upon network or server failure, the target computer loses connection and cannot continue to receive data. Upon the network or system recovery, the target computer can again start downloading the in-place reconstructible delta files. At this time, the client reads and discards the processed commands.

For network and server failure, the client must store the counter in the target computer memory. If the target computer fails, the counter must have been stored in a non-volatile storage device such as NVRAM or disk.

Figure 6:
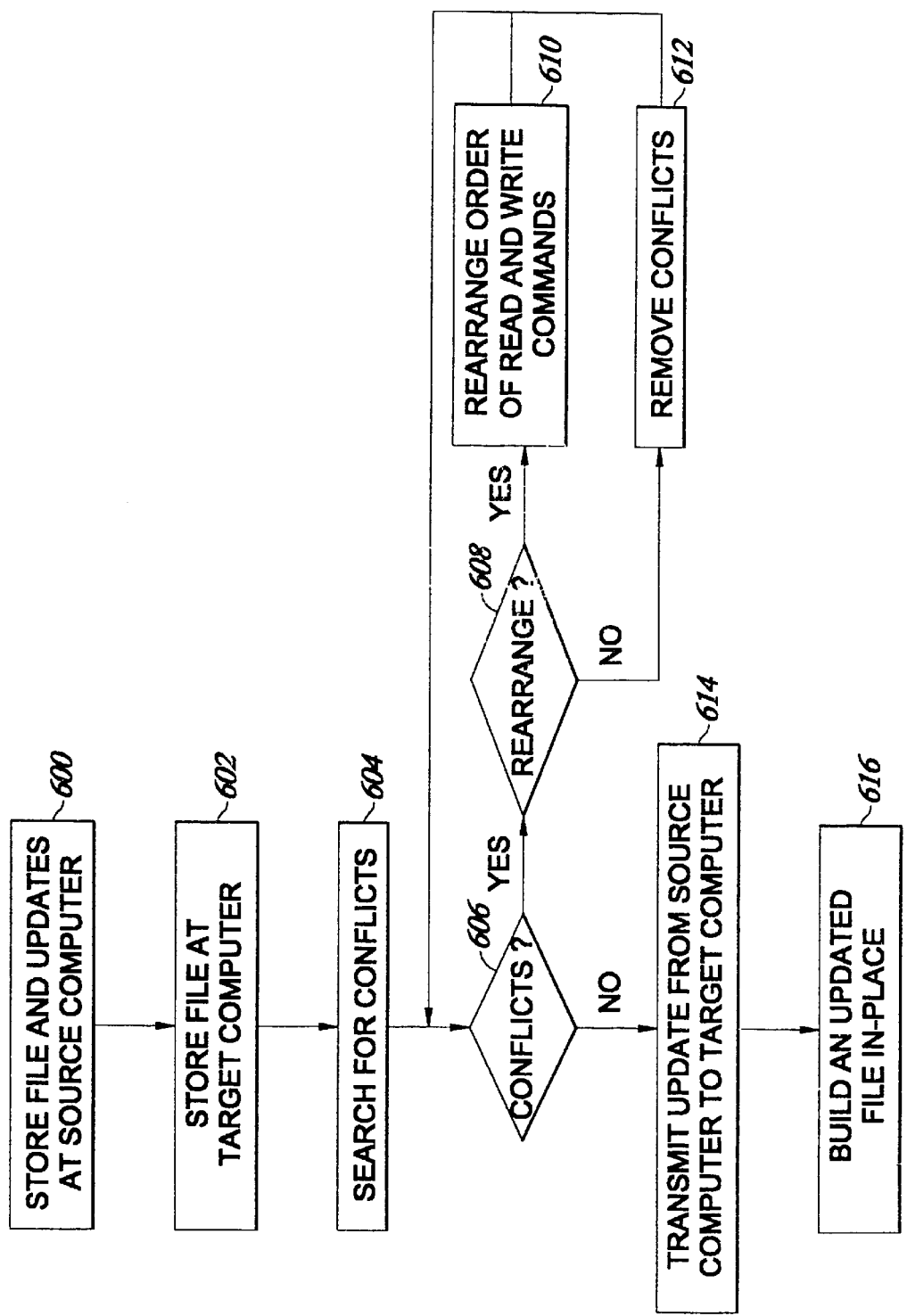
FIG. 6 is a flowchart that illustrates the functions performed by an alternative embodiment of the present invention.

FIG. 6 is a flowchart that illustrates the functions performed by an alternative embodiment of the present invention.

Block 600 represents the alternative embodiment of the present invention storing the first version of the file 200 and updates 202 at the source computer 204. In this embodiment, the updates 202 are in the form of delta compression files. A delta file represents a second version of the file as a set of changes to the first version. The delta file also includes an ordered set of read and write commands.

Block 602 represents the alternative embodiment of the present invention storing the first version of the file 200 in the target memory location 206.

Block 604 represents the alternative embodiment of the present invention performing post-processing by searching for conflicts in the delta file. Conflicts occur when the delta file commands require the delta file to first write to a region of memory and then later read from that same region. Delta files 306 both copy data from the old file version to the new version and add data to the new version that does not appear in the old version. An arbitrary delta file, when reconstructing a version in-place, may attempt to read from a file region that it has already written. In this case. the data it attempts to read has already been altered and the file to be rebuilt is not correct. By detecting and avoiding such conflicts, the preferred embodiment of the invention rebuilds delta encoded versions with no scratch space.

Block 606 is a decision block that represents the alternative embodiment of the present invention determining whether a conflict exists. If a conflict exists, then the invention proceeds to Block 608. Otherwise, if no conflict exits, the invention proceeds to block 614.

Block 608 is a decision block that represents the alternative embodiment of the present invention determining whether rearranging the order of the read and write commands is possible. If so, control proceeds to Block 610. Otherwise, if rearrangement is impossible, the invention proceeds to 612.

Block 610 represents the alternative embodiment of the present invention rearranging the order of the read and write commands. Executing the new order, the invention reads a region of the memory, then later writes to the same region of the memory. Control is returned to Block 606.

Block 612 represents an alternative embodiment of the present invention converting the delta file into an equivalent, but slightly larger delta file, that lacks conflicts. Control is returned to Block 606.

Block 614 represents the present invention transmitting files. Finally. the computer rebuilds the delta encoded version and creates a second version of the file in-place, as represented by Block 616.

Conclusion

This concludes the description of the preferred embodiment of the invention. The following paragraphs describe some alternative methods of accomplishing the same objects.

In alternative embodiments of the present invention, other types and configurations of computers or processors could be used. For example, the invention need not be restricted to the hardware and software configuration illustrated herein. Those skilled in the art will recognize that the computers identified herein could represent any device or appliance with a processor capable of being programmed remotely, such as network computers, personal digital assistants, phones, smart cards, set-top boxes, etc.

In alternative embodiments of the present invention, other structures and methods could be used to create the files described herein. For example, the invention could use different types of compression to accomplish the same objectives. Those skilled in the art will recognize that the methods identified herein could represent any identical or similar method.

In conclusion, the present invention discloses a method, apparatus, and article of manufacture for generating, transmitting, replicating, and rebuilding in-place reconstructible software updates to a file from a source computer to a target computer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating in-place reconstructible delta files on a source computer and reconstruction the in-place delta files on a target computer, comprising the following steps:

creating an in-place reconstructible delta file on the source computer, wherein the in-place reconstructible delta file comprises a plurality of changes made between a prior version of a file and a new version of a file and a plurality of read and write commands and wherein the source computer discards the prior version of the file and the new version of the file after generating the in-place reconstructible delta file;

storing the prior version of the file in a memory of the target computer; and at the target computer, using the in-place reconstructible delta file from the source computer to rebuild the new version of the file in-place by building the new version in a same region of the memory of the target computer in which the prior version resides.

2. The method of claim 1, further comprising the following steps:

creating a plurality of copies of the in-place reconstructible delta file; and transmitting the copies to a plurality of servers, the servers being source computers for the in-place reconstructible delta file.

3. The method of claim 1, further comprising the following step:

detecting one or more conflicts in at least one region of the in-place reconstructible delta file where the in-place reconstructible delta file may be first written to and then later read from.

4. The method of claim 3, further comprising the following step:

rearranging an order of the read and write commands such that the in-place reconstructible delta file is first read from and then later written to.

5. The method of claim 4, wherein the rearranging step further comprises the following step:

converting the in-place reconstructible delta file into a revised in-place reconstructible delta file that lacks conflicts.

6. The method of claim 3, further comprising the following step:

converting copy commands to add commands.

7. The method of claim 3, further comprising the following steps:

performing a copy command in an overlapping data region starting from a left region and ending at a right region.

8. The method of claim 3, further comprising the following step:

performing copy commands in an overlapping data region starting from a right region and ending at a left region.

9. The method of claim 1, further comprising the following steps:

maintaining a progress counter at the target computer to track the number of executed read and write commands;

re-transmitting the in-place reconstructible delta files after a system failure;

counting read and write commands until the counted value matches the progress counter;

discarding the counted read and write commands; and using the in-place reconstructible delta file at the target computer to rebuild the new version of the file in-place by building the new version in a same region of the memory of the target computer in which the prior version resides.

10. An apparatus for generating in-place reconstructible delta files on a source computer and reconstructing the in-place delta files on a target computer, comprising:

(a) a computer;

(b) means performed by the computer, for:

creating an in-place reconstructible delta file on the source computer, wherein the in-place reconstructible delta file comprises a plurality of changes made between a prior version of a file and a new version of a file and a plurality of read and write commands and wherein the source computer discards the prior version of the file and the new version of the file after generating the in-place reconstructible delta file;

storing the prior version of the file in a memory of the target computer; and at the target computer, using the in-place reconstructible delta file from the source computer to rebuild the new version of the file in-place by building the new version in a same region of the memory of the target computer in which the prior version resides.

11. The apparatus of claim 10, farther comprises:

(c) means, performed by the computer, for:

creating a plurality of copies of the in-place reconstructible delta file; and transmitting the copies to a plurality of servers, the servers being source computers for the in-place reconstructible delta file.

12. The apparatus of claim 10, further comprises:

means, performed by the computer, for detecting one or more conflicts in at least one region of the in-place reconstructible delta file where the in-place reconstructible delta file may be first written to and then later read from.

13. The apparatus of claim 12, further comprises:

means, performed by the computer, for rearranging an order of the read and write commands such that the in-place reconstructible delta file is first read from and then later written to.

14. The apparatus of claim 13, wherein the means of rearranging further comprises converting the in-place reconstructible delta file into a revised in-place reconstructible delta file that lacks conflicts.

15. The apparatus of claim 12, further comprises means, performed by the computer, for converting copy commands to add commands.

16. The apparatus of claim 12, further comprises means, performed by the computer, for performing a copy command in an overlapping data region starting from a left region and ending at a right region.

17. The apparatus of claim 12, further comprising means, performed by the computer, for performing copy commands in an overlapping data region starting from a right region and ending at a left region.

18. The apparatus of claim 10, further comprises:

(c) means, performed by the computer for:

maintaining a progress counter at the target computer to track the number of executed read and write commands;

re-transmitting the in-place reconstructible delta files after a system failure;

counting read and write commands until the counted value matches the progress counter;

discarding the counted read and write commands; and using the in-place reconstructible delta file at the target computer to rebuild the new version of the file in-place by building the new version in a same region of the memory of the target computer in which the prior version resides.

19. An article of manufacture comprising a program storage medium readable by a computer, the medium tangibly embodying one or more programs of instructions executable by the computer to perform method steps for generating in-place reconstructible delta files on a source computer and reconstructing the in-place delta files on a target computer, the method comprising the steps of:

creating an in-place reconstructible delta file on the source computer, wherein the in-place reconstructible delta file comprises a plurality of changes made between a prior version of a file and a new version of a file and a plurality of read and write commands and wherein the source computer discards the prior version of the file and the new version of the file after generating the in-place reconstructible delta file;

storing the prior version of the file in a memory of the target computer; and at the target computer, using the in-place reconstructible delta file from the source computer to rebuild the new version of the file in-place by building the new version in a same region of the memory of the target computer in which the prior version resides.

20. The article of manufacture of claim 19, further comprising the following steps:

creating a plurality of copies of the in-place reconstructible delta file; and transmitting the copies to a plurality of servers, the servers being source computers for the in-place reconstructible delta file.

21. The article of manufacture of claim 19, further comprising the following step:

detecting one or more conflicts in at least one region of the in-place reconstructible delta file where the in-place reconstructible delta file may be first written to and then later read from.

22. The article of manufacture of claim 21, further comprising the following step:

converting copy commands to add commands.

23. The article of manufacture of claim 21, further comprising the following steps:

performing a copy command in an overlapping data region starting from a left region and ending at a right region.

24. The article of manufacture of claim 21, further comprising the following step:

performing copy commands in an overlapping data region starting from a right region and ending at a left region.

25. The article of manufacture of claim 21, further comprising the following step:

rearranging an order of the read and write commands such that the in-place reconstructible delta file is first read from and then later written to.

26. The article of manufacture of claim 25, wherein the rearranging step further comprises the following step:

converting the in-place reconstructible delta file into a revised in-place reconstructible delta file that lacks conflicts.

27. The article of manufacture of claim 19, further comprising the following steps:

maintaining a progress counter at the target computer to track the number of executed read and write commands;

re-transmitting the in-place reconstructible delta files after a system failure;

counting read and write commands until the counted value matches the progress counter;

discarding the counted read and write commands; and using the in-place reconstructible delta file at the target computer to rebuild the new version of the file in-place by building the new version in a same region of the memory of the target computer in which the prior version resides.

* * * * *